United States Patent

[11] 3,607,867

| [72] | Inventors | Shigeho Inaba<br>Takarazuka-shi;<br>Toshiyuki Hirohashi, Kobe; Takahiro Izumi, Takarazuka-shi; Hisao Yamamoto, Nishinomiya-shi, all of Japan |
|---|---|---|
| [21] | Appl. No. | 799,503 |
| [22] | Filed | Feb. 14, 1969 |
| [45] | Patented | Sept. 21, 1971 |
| [73] | Assignee | Sumitomo Chemical Company, Ltd.<br>Osaka, Japan |
| [32] | Priority | Feb. 21, 1968 |
| [33] | | Japan |
| [31] | | 43/011300 |

[54] PURIFICATION OF BENZODIAZEPINE DERIVATIVES
8 Claims, No Drawings

[52] U.S. Cl. .................................................. 260/239.3D,
 260/701, 260/707
[51] Int. Cl. ........................................................ C07d 53/06
[50] Field of Search ................................................ 260/239.3
 BD

[56] References Cited
FOREIGN PATENTS
1,351,749  12/1963  France ........................ 260/239

Primary Examiner—Henry R. Jiles
Assistant Examiner—Robert T. Bond
Attorney—Stevens, Davis, Miller & Mosher ABSTRACT: A 1-alkyl-5-phenyl-7-chloro-1,3-dihydro-2H-1,4-benzodiazepine-2-one derivative, which is useful as a tranquilizer, a muscle relaxant or a spasmolytic, is purified by dissolving a crude benzodiazepine derivative in hydrochloric acid, partially neutralizing by adding an aqueous alkali solution to deposit impurities such as 2-methylamino-5-chlorobenzophenone, removing the deposited impurities from the solution by filtration, further adding the aqueous alkali solution to the filtrate and separating the purified benzodiazepine derivative from the filtrate by solvent extraction.

3,607,867

1

PURIFICATION OF BENZODIAZEPINE DERIVATIVES

This invention relates to a novel procedure for the purification of 1-alkyl-5-phenyl-7-chloro-1,3-dihydro-2H1,4-benzodiazepine-2-one derivative. The term "alkyl" means an alkyl having from 1 to 3 carbon atoms or cyclopropylmethyl. More particularly, the invention pertains to a procedure in which a crude 1-alkyl-5-phenyl-7-chloro-1,3-dehydro-2H-1,4-benzodiazepine-2-one derivative is dissolved in hydrochloric acid, partially neutralized with an alkali and then freed from deposited impurities, thereby a pure benzodiazepine derivative is obtained.

A 1-alkyl-5-phenyl-7-chloro-1,3-dihydro-2H-1,4-benzodiazepine-2-one derivative is remarkably effective tranquilizer, muscle relaxant or spasmolytic. It is therefore needless to say that this compound should be extremely high in purity.

A 1-alkyl-5-phenyl--methyl--chloro-1,3-dihydro-2H-1,4-benzodiazepine -2-one derivative can MP prepared according to a process carried out by treating, for example, 2-(2-bromo-N-methyl-acetamide)-5-chlorobenzophenone with alcoholic ammonia [German Pat. No. 1,136,709], or by treating 2-(N-methyl-tosyloxyacetamide)-5-chlorobenzophenone with ammonia [Canadian Pat. No. 799,986]. The product, which is obtained in the procedure mentioned above, is of colored crystals. The present inventors have found that the color is due to impurities such as 2-alkylamino-5chlorobenzophenone which are difficult to be removed according to an ordinary decolorization procedure such as recrystallization or active carbon treatment.

In order to purify crude 1-methyl-5-phenyl-7-chloro-1,3-dihydro-2H-1,4-benzodiazepine-2-one, U.S. Pat. No. 3,102,116 discloses a process which comprises treating the said compound with dilute hydrochloric acid, separating the resulting insoluble material, treating the resulting liquor with nitric acid or sulfuric acid, isolating the resultant insoluble material, mixing the aqueous ammonia solution, heating the resulting mixture, permitting the resulting mixture to cool and separating purified 1-methyl-5-phenyl-7-chloro-1,3-dihydro-2H-1,4-benzodiazepine-2-one. even according this process, it is extremely difficult to completely remove impurities and this procedure is complex in practicing commercially.

The present inventors 2 found that a crude benzodiazepine derivative is purified by removing such impurities as 2-alkylamino-5-chlorobenzophenone formed in the production of the benzodiazepine derivative by partially neutralization of hydrochloric acid solution thereof with a base.

This procedure can be applied to the purification of a 1alkyl-5-phenyl-7-chloro-1,3-dihydro-2H-1,4-benzodiazepine-2-one derivative which is prepared according to other processes 130°that mentioned above, e.g., a process carried out by treating 2-(N-alkylphthalimide acetamide)-5-chlorobenzophenone with a hydrazine hydrate [Japanese Pat. publication No. 14,833/1966], or a process carried out by treating 1-alkyl-2-amino-methyl-3-phenyl-5-chloroindole with an oxidizing agent [H. Yamamoto et al., Ber. 101, 4245 (1968)].

It is an object of the present invention to provide a process for simply and effectively purifying 1-alkyl-5-phenyl-7-chloro-1,3-dihydro-2H-1,4-benzodiazepine-2-one derivative in commercial scale.

In order to accomplish this object, the present invention provides a process for purifying 1-alkyl-5-phenyl-7-chloro-1,3-dihydro-2H-1,4-benzodiazepine-2-one derivative, which comprises dissolving the crude benzodiazepine compound in an aqueous hydrochloric acid solution, adding a base to the resultant solution, removing the separated impurities from the solution by filtration, adding again a base to the filtrate, and then separating the deposited benzodiazepine compound from the aqueous solution to obtain the objective pure 1-alkyl-5-phenyl-7-chloro-1,3-dihydro-2H-1,4-benzodiazepine-2-one derivative.

In dissolving the crude benzodiazepine derivative in an aqueous hydrochloric acid, concentration of hydrochloric acid is 1N or more, preferably 2–6 N. It is difficult to dissolve a benzodiazepine derivative in hydrochloric acid of a concentration less than 1 N. The use of high concentration of hydrochloric acid is inadequate because of causing to hydrolize a benzodiazepine derivative. Amount of the hydrochloric acid in the present invention is 2.5 or more moles of hydrogen chloride per 1 mole of f the benzodiazepine compound. Dissolving the benzodiazepine derivative is carried out at room temperature with stirring.

The addition of a base to the aqueous hydrochloric acid solution causes precipitate of impurities. The base used in the process of the present invention includes sodium hydroxide, potassium hydroxide, sodium carbonate, potassium carbonate, barium hydroxide, ammonia and the like. Sodium hydroxide and potassium hydroxide are preferable. These bases are used as an aqueous solution. Concentration of the base in water is not critical but preferably 2 N or more. The mixture is kept at 0° to 20° C. with stirring during addition of a base. The addition of a base is stopped just before the crystals of the benzodiazepine derivative starts to precipitate. Amount of a base for producing crystals from the solution depends upon a king of a benzodiazepine derivative. For example, 1-methyl-5-phenyl-7-chloro-1,3-dihydro-2H-1,4-benzodiazepine-2-one begins to deposit when amount of hydrogen chloride is attained to nearly 1.2 equimolar amount to that of the benzodiazepine derivative as hydrochloric acid in the solution. When a base is added to the solution as far as an amount of hydrogen chloride in the solution becomes to 1.2–8.0 moles amount, preferably 1.3–2.0 moles amount, to 1 mole amount of the benzodiazepine derivative, the impurities are substantially completely separated in the solution.

In the case of a purification of 1-cyclopropylmethyl-5-phenyl-7-chloro-1,3-dihydro-2H-1,4-benzodiazepine-2-one, a base is added to the solution so far as an amount of hydrogen chloride in the solution becomes to about 5 moles amount to 1 mole amount of the benzodiazepine derivative.

Removal of the resulting impurities can be carried out by filtration, preferably after treatment of adsorbent such as active charcoal, Celite or the like.

The purified benzodiazepine derivative is recovered by nearly neutralizing the filtrate with a base, preferably ammonia, extracting the mixture with a suitable solvent, and removing the solvent. The addition of the base is preferably carried out at a temperature of 0°–20° C. with stirring Suitable solvents are methylene dichloride, chloroform, carbon tetrachloride, benzene, toluene and the like. The purified benzodiazepine derivative can also be recovered by collecting the crystals formed during neutralization by filtration.

According to the purification of the present invention a 1-alkyl-5-phenyl-7-chloro-1,3-dihydro-2H-1,4-benzodiazepine-2-one derivative can be purified and decolored very simply and effectively. As will be appreciated by those skilled in the art, the above-described treatment is susceptible to manipulative variations, for example, dissolving the benzodiazepine derivative in hydrochloric acid can also be performed by dissolving the benzodiazepine derivative in a suitable solvent, such as methylene dichloride, chloroform, carbon tetrachloride or the like, and then extracting the resulting solution with hydrochloric acid.

Such variations and manipulative procedures are apparent to those skilled in the art and are within the scope of the present invention.

The process of the present invention will be illustrated in detail below with reference to examples, but it is needless to say that the examples are merely illustrative and the invention is not limited thereto.

Example 1

A yellow crude 1-methyl-5-phenyl-7-chloro-1,3-dihydro-2H-1,4-benzodiazepine-2-one, MP 130°–132° C. 5.0 g. (0.01765 mole) prepared by treating 1-methyl-2-aminomethyl-3-phenyl-5-chloroindole sulfate with chromic anhydride in acetic acid was dissolved in 50.0 ml. of 2 N hydrochloric acid (f. 0.935) at room temperature. To the ice-cooled solution was added dropwise 33.5 ml. of a 2-N aqueous sodium hydroxide solution (f. 1.000) below 20° C., under ice cooling with stirring, while reddish-orange precipitates were formed. After the mixture was stirred for additional 10 minutes, 0.25 g. of active carbon was added thereto and stirred. After filtration, the filtrate was basified with aqueous ammonia under ice cooling with stirring. After stirring was continued for 10 minutes, white precipitates formed were extracted with carbon tetrachloride. The extract was dried over sodium sulfate, treated with 0.25 g. of active carbon and filtered and then the residue was washed with 5 ml. of carbon tetrachloride. The filtrate and the washings were combined, and the solvent was removed under reduced pressure to a residue which was crystallized on treatment with 10 ml. of isopropyl alcohol. After ice cooling, the deposited crystals were collected by filtration and recrystallized from 20 ml. of isopropyl alcohol to give 4.30 g. of purified 1-methyl-5-phenyl-7-chloro-1,3-dihydro-2H-1,4-benzodiazepine-2-one as colorless prisms, MP 132°–134° C.

Thin layer chromatography showed [silica gel (Kieselgel GF 254), ethyl acetate-chloroform (10:7), UV detection] showed a single spot (Rf =0.52), and the spot of Rf =0.78 (yellow, 2-methylamino-5-chlorobenzophenone) and other spots observed in the crude product, were disappeared.

Example 2

To a solution of 2 g. (0.00702 mole) of yellow crude 1-methyl-5-phenyl-7-chloro-1,3-dihydro-2H-1,4-benzodiazepine-2-one MP 130°–133° C.) in 6.00 ml. of 3.0-N hydrochloric acid was added dropwise 7.25 ml. of 1-N aqueous sodium hydroxide solution (f. 1.033) under ice cooling, while yellowish-orange fine precipitates deposited. After stirring the mixture for 10 minutes, 0.1 g. of active carbon was added. The mixture was stirred and then filtered, and the residue was washed with a small amount of water. The filtrate and the washing were combined. The mixture was basified with an aqueous ammonia to pH 9–10 under cooling. Deposited precipitates were extracted two times with 10 ml. of carbon tetrachloride. The extract was washed two times with 10 ml. of water, was dried over sodium sulfate, treated with 0.1 g. of active carbon and was filtered. The filtrate and the washings were combined, and the solvent was removed under reduced pressure to a residue which was crystallized from 5 ml. of isopropyl alcohol. After cooling, deposited crystals were collected by filtration, washed with a small amount of isopropyl alcohol and then dried to give 1.7 g. of purified 1-methyl-5-phenyl-7-chloro-1,3-dihydro-2H-1,4-benzodiazepine-2-one as colorless prisms, MP 132.5°–134°C.

Example 3

Pale yellow crude 1-methyl-5-phenyl-7-chloro-1,3-dihydro-2H-1,4-benzodiazepine-2-one MP 128°–132° C. 30.0 g. obtained by treating 1-methyl-2-aminomethyl-3-phenyl-5-chloroindole sulfate in acetic acid with chromic anhydride was dissolved in 300 g. of 7.06 wt./wt. percent hydrochloric acid at room temperature. To this solution was added dropwise at below 20° C. under cooling with stirring 228 g. of an aqueous 7.41 wt./wt. percent sodium hydroxide solution, while reddish-orange precipitates were formed. After the mixture was stirred for additional 10 minutes, 1.5 g. of active carbon was added thereto. The mixture was filtered, and the residue was washed with about 20 ml. of water. Subsequently, the filtrate and the washings were combined, and 300 g. of carbon tetrachloride was added thereto. The mixture was basified by dropwise addition of aqueous ammonia under cooling with stirring. After the mixture was stirred at about 20° C. for about 10 minutes, the carbon tetrachloride liquid layer was separated, and the aqueous layer was extracted with 210 g. of carbon tetrachloride. The carbon tetrachloride extracts were combined and dried over anhydrous sodium sulfate, filtered after treatment with 1.5 g. of active carbon and then washed with about 50 g. of carbon tetrachloride. The filtrate and the washings were combined and the carbon tetrachloride was removed under reduced pressure. The residue was crystallized by treating with 70.0 g. of isopropyl alcohol to dissolve and cooling under stirring. The deposited crystals were collected by filtration, washed with about 8 g. of isopropyl alcohol and then recrystallized from 100 g. of isopropyl alcohol to give 24.5 g. of purified 1-methyl-5-phenyl-7-chloro-1,3-dihydro-2H-1,4-benzodiazepine-2-one as colorless prisms, MP 132°–134° C.

Example 4

2-(N-methyl-tosyloxyacetamido)-5-chlorobenzophenone was reacted in ethanol solution with ammonia, and the resulting crude 1-methyl-5-phenyl-7-chloro-1,3-dihydro-2H-1,4-benzodiazepine-2-one was recrystallized from ethanol to give a yellow crystalline product, MP 131°–133° C. A solution of 6.0 g. of the thus obtained product in 150 ml. of carbon tetrachloride was extracted three times with 50 ml. of 3.33-N hydrochloric acid. The hydrochloric acid extracts were combined and partially neutralized by adding dropwise 65 ml. of a 5.14-N aqueous sodium hydroxide solution, while yellow fine precipitates were formed. The mixture was treated with 0.3 g. of active carbon, stirred, filtered and washed with water. The filtrate and the washings were combined and basified with aqueous ammonia under ice cooling, and extracted with carbon tetrachloride. The extract was washed with water, dried over sodium sulfate, filtered after treatment with 0.3 g. of active carbon, and washed with carbon tetrachloride. Thereafter, the filtrate and the washings were combined, and the carbon tetrachloride was removed under reduced pressure. The residue was crystallized from 2 ml. of isopropyl alcohol. After ice cooling, the crystals were collected by filtration, washed with a small amount of isopropyl alcohol and dried to give 5.4 g. of purified 1-methyl-5-phenyl-7-chloro-1,3-dihydro-2H-1,4-benzodiazepine-2-one as colorless crystals, MP 132.5°–134°C.

Example 5

1-Cyclopropylmethyl-2-aminomethyl-3-phenyl-5-chloroindole hydrochloriole was treated in acetic acid with chromic anhydride to give yellow crude crystals of 1-cyclopropylmethyl-5-phenyl-7-chloro-1,3-dihydro-2H-1,4-benzodiazepine-2-one, MP 139.5°–141.5° C. 1.00 g. of the thus obtained compound was dissolved in 12 ml. of 12-wt./wt. percent aqueous hydrochloric acid at room temperature. To this solution was added dropwise, 14 ml. of 7 percent aqueous sodium hydroxide with stirring below 20° C., whereby reddish-orange crystals were formed. After the mixture was stirred for additional 20 minutes, 0.05 g. of active carbon was added thereto. After filtration, aqueous ammonia was added dropwise to the filtrate with stirring on ice cooling and the produced precipitate was extracted with carbon tetrachloride. The extract was washed with water, dried over anhydrous sodium sulfate and treated with 0.05 g. of active carbon. The solvent was removed under reduced pressure to a residue, which was crystallized on the treatment of 1.5 ml. of isopropyl alcohol. After ice cooling, the deposited crystals were collected by filtration and recrystallized from 2 ml. of isopropyl alcohol to give 0.83 g. purified 1-cyclopropylmethyl-5-phenyl-7-chloro-1,3-dihydro-2H-1,4-benzodiazepine-2-one as colorless prisms, MP 144.5°–145° C.

We claim:

1. A process for purifying 1alkyl-5-phenyl-7-chloro-1,3-dihydro-2H-1,4-benzodiazepin-2-one, wherein said alkyl is a $C_1$–$C_3$ alkyl or cyclopropylmethyl, which comprises dissolving crude 1-alkyl-5-phenyl-7-chloro-1,3-dihydro-2H-1,4-benzodiazepin-2-one in an aqueous hydrochloric acid of a concentration of 1–6N to prepare an aqueous hydrochloric acid solution of the crude benzodiazepine derivative, adding a base into the resultant solution to precipitate impurities formed in the production of the benzodiazepine derivative to be purified by treating 2-(2-bromo-N-methylacetamide)-5-chlorobenzophenone with alcoholic ammonia, or 2-(N-alkyl-tosyloxyacetamide)-5-chlorobenzophenone with ammonia, or 2-(N-alkylphthalimide acetamide)-5-chlorobenzophenone with hydrazine hydrate, or 1-alkyl-2-aminomethyl-3-phenyl-5-chloroindole with an oxidizing agent, stopping addition of the base just before the crystals of the benzodiazepine derivative start to precipitate, removing the impurities by filtration, adding a base to the obtained filtrate, and separating the objective pure 1-alkyl-5-phenyl-7-chloro-1,3-dihydro-2H-1,4-benzodiazepin-2-one from the filtrate.

2. A process according to claim 1, wherein said base is sodium hydroxide, potassium hydroxide, sodium carbonate, potassium carbonate, barium hydroxide or ammonia.

3. A process according to claim 1, wherein the impurity is a 2-alkylamino-5-chlorobenzophenone.

4. A process for decolorizing colored crystals of crude 1-alkyl-5-phenyl-7-chloro-1,3-dihydro-2H-1,4-benzodiazepin-2-one formed in the production thereof, wherein said alkyl is a $C_1$–$C_3$ alkyl or cyclopropylmethyl, by treating 2-(2-bromo-N-methylacetmaide)-5-chlorobenzophenone with alcoholic ammonia, or 2-(N-alkyl-tosyloxyacetmaide)-5-chlorobenzophenone with ammonia, or 2-(N-alkylphthalimide acetamide)-5-chlorobenzophenone with hydrazine hydrate, or 1-alkyl-2-aminomethyl-3-phenyl-5-chloroindole with an oxidizing agent, which comprises dissolving crude 1-alkyl-5-phenyl-7-chloro-1,3-dihydro-2H-1,4-benzodiazepin-2-one in an aqueous hydrochloric acid of a concentration of 1–6N to prepare an aqueous hydrochloric acid solution of the crude benzodiazepine derivative, adding a base into the resultant solution to precipitate impurities formed in said production, stopping addition of the base just before the crystals of the benzodiazepine derivative start to precipitate, removing the impurities by filtration, adding a base to the obtained filtrate, and separating the objective pure 1-alkyl-5-phenyl-7-chloro-1,3-dihydro-2H-1,4-benzodiazepin-2-one from the filtrate.

5. A process for purifying 1-methyl-5-phenyl-7-chloro-1,3-dihydro-2H-1,4-benzodiazepin-2-one, which comprises dissolving crude 1-methyl-5-phenyl-7-chloro-1,3-dihydro-2H-1,4-benzodiazepin-2-one to be purified in an aqueous hydrochloric acid of a concentration of 1–6N to prepare an aqueous hydrochloric acid solution of the crude 1-methyl-5-phenyl-7-chloro-1,3-dihydro-2H-1,4-benzodiazepin-2-one, adding an aqueous alkali metal hydroxide into the resultant solution until the amount of hydrogen chloride becomes 1.2–8.0 moles per mole of the 1-methyl-5-phenyl-7-chloro-1,3-dihydro-2H-1,4-benzodiazepin-2-one to precipitate impurities formed in the production of the 1-methyl-5-phenyl-7-chloro-1,3-dihydro-2H-1,4-benzodiazepin-2-one to be purified by treating 2-(2-bromo-N-methylacetamide)-5-chlorobenzophenone with alcoholic ammonia, or 2-(N-alkyl-tosytoxyacetamide)-5-chlorobenzophenone with ammonia, or 2-(N-alkylphthalimide acetamide)-5chlorobenzophenone with hydrazine hydrate, or 1-alkyl-2aminmethyl-3-phenyl-5chloroindole with an oxidizing agent, removing the impurities by filtration, adding aqueous ammonia to the obtained filtrate to precipitate 1-methyl-5-phenyl-7-chloro-1,3-dihydro-2H-1,4-benzodiazepin-2-one, and separating the objective pure 1-methyl-5-phenyl-7-chloro-1,3-dihydro-2H-1,4-benzodiazepin-2-one.

6. A process according to claim 5, wherein the impurity is 2-methylamino-5-chlorobenzophenone.

7. A process for purifying 1-cyclopropyl-methyl-5-phenyl-7-chloro-1,3-dihydro-2H-1,4-benzodiazepin-2-one, which comprises dissolving crude 1-cyclopropylmethyl-5-phenyl-7-chloro-1,3-dihydro-2H-1,4-benzodiazepin-2-one to be purified in aqueous hydrochloric acid having a concentration of 4–5N to prepare an aqueous hydrochloric acid solution of the crude 1-cyclopropylmethyl-5-phenyl-7-chloro-1,3-dihydro-2H-1,4-benzodiazepin-2-one, adding an aqueous alkali metal hydroxide into the resultant solution until the amount of hydrogen chloride becomes about 5 moles per mole of the 1-cyclopropylmethyl-5-phenyl-7-chloro-1,3-dihydro-2H1,4-benzodiazepin-2-one to precipitate impurities formed in the production of the 1-cyclopropylmethyl- 5phenyl-7-chloro-1,3-dihydro-2H-1,4-benzodiazepin-2-one to be purified by treating 2-(2-bromo-N-methylacetamide)-5-chlorobenzophenone with alcoholic ammonia, or 2-(N-alkyl-tosyloxyacetamide)-5-chlorobenzophenone with ammonia, or 2-(N-alkylphthalimide acetamide)-5-chlorobenzophenone with hydrazine hydrate, or 1-alkyl-2-aminomethyl-3-phenyl-5-chloroindole with an oxidizing agent, removing the impurities by filtration, adding aqueous ammonia to the obtained filtrate to precipitate 1-cyclopropylmethyl-5-phenyl-7-chloro-1,3-dihydro-2H-1,4-benzodiazepin-2-one, and separating the objective pure 1-cyclopropylmethyl-5-phenyl-7-chloro-1,3-dihydro-2H-1,4-benzodiazepin-2-one from the filtrate.

8. A process according to claim 7, wherein the impurity is 2-cyclopropylmethylamino-5-chlorobenzophenone.